United States Patent [19]

Kasson

[11] 4,253,000
[45] Feb. 24, 1981

[54] METHOD AND SYSTEM FOR REDUCING CONFERENCE BRIDGE OSCILLATIONS

[75] Inventor: James M. Kasson, Menlo Park, Calif.

[73] Assignee: Rolm Corporation, Santa Clara, Calif.

[21] Appl. No.: 4,255

[22] Filed: Jan. 18, 1979

[51] Int. Cl.³ .............................................. H04M 3/56
[52] U.S. Cl. .................... 179/18 BC; 370/62
[58] Field of Search ................... 179/18 BC, 1 CN; 370/62, 57

[56] References Cited

U.S. PATENT DOCUMENTS

| | | | |
|---|---|---|---|
| 3,984,643 | 10/1976 | Inrig et al. ............... | 179/18 BC |
| 4,054,757 | 10/1977 | LeJay ........................ | 179/18 BC |
| 4,153,817 | 5/1979 | D'Ortenzio ............... | 179/18 BC |

Primary Examiner—Thomas W. Brown
Attorney, Agent, or Firm—Townsend and Townsend

[57] ABSTRACT

Undesired oscillations in a communications conferencing network are reduced and/or eliminated by frequency shifting signals passing through the conferencing network by a small amount for each pass therethrough.

Electrical information signals from a plurality of individual communication sets are individually summed, frequency shifted by a predetermined amount, and coupled back to individual ones of the communication sets, less their individual signal contributions. Frequency shifting is performed on analog electrical information signals by modulating the sum signals, filtering the modulated signals and remodulating the filtered signals with a second carrier signal train having a frequency which differs from the frequency of the first carrier signal train by a predetermined amount, and filtering the signals resulting from the second modulating step.

Frequency shifting on digital information signals is performed by digitally expanding the spectral range of the sum signals to provide a plurality of replicas of the spectral content of the signals distributed over a wide spectral range, digitally filtering the expanded signals to filter out predetermined portions of the expanded range, digitally shifting the frequency of the remaining replicas by a second expansion, and digitally filtering the frequency shifted replicas to filter out unwanted portions of the shifted spectrum.

28 Claims, 12 Drawing Figures

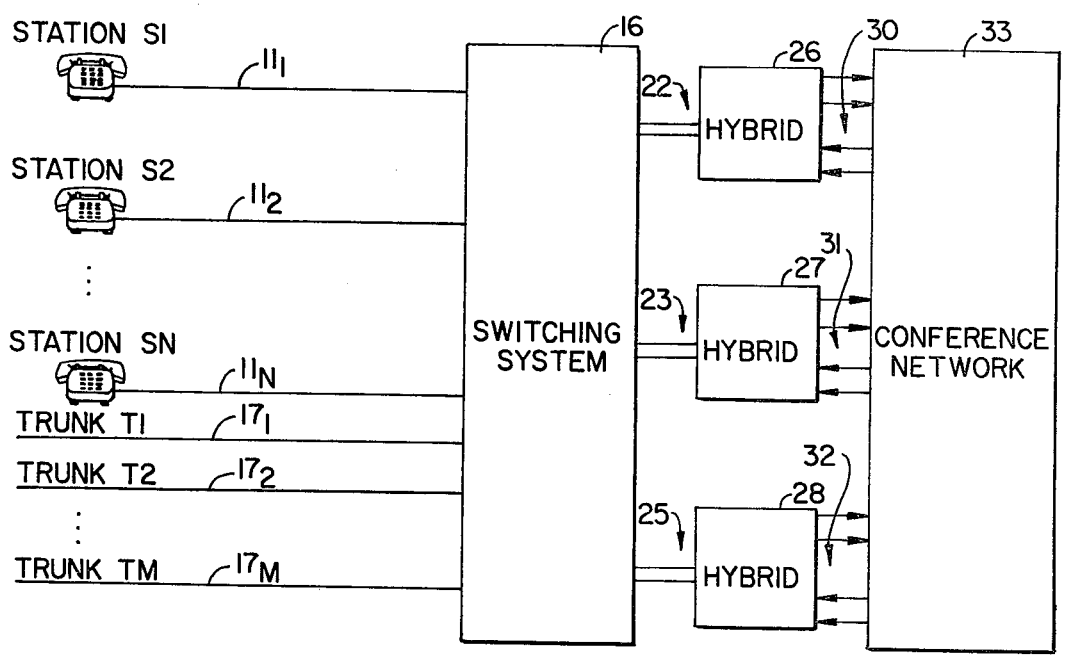
FIG._1.
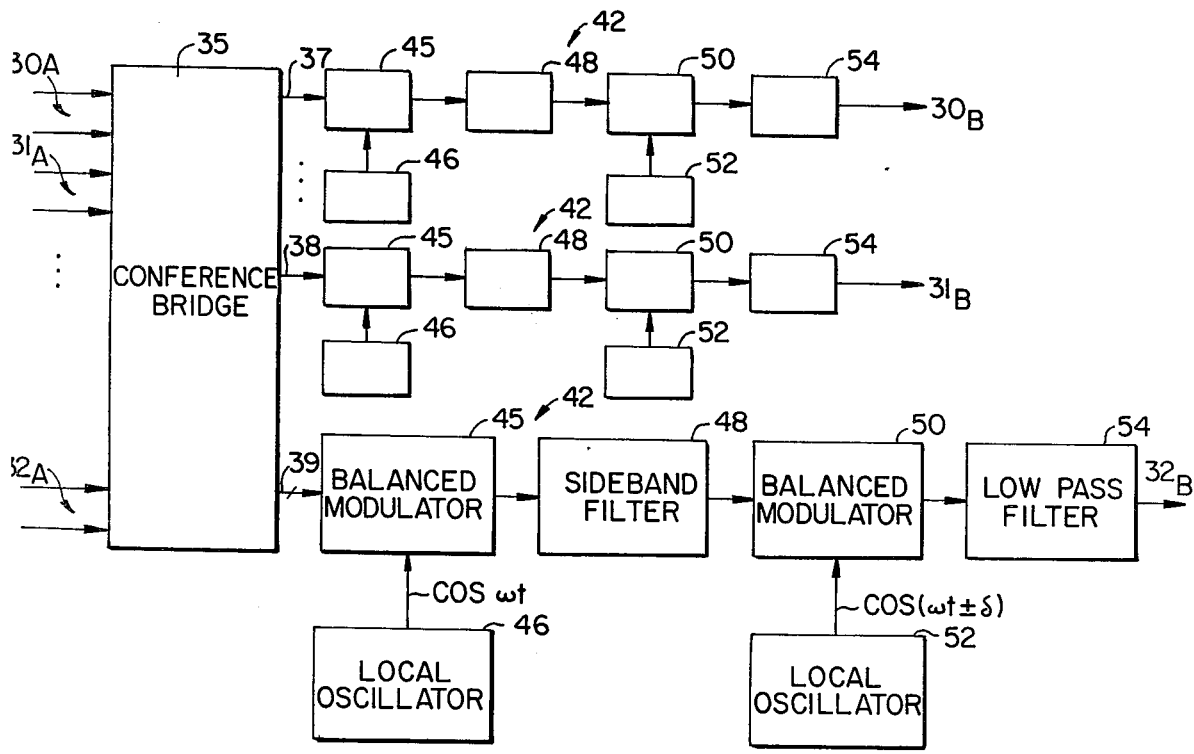
FIG._2.

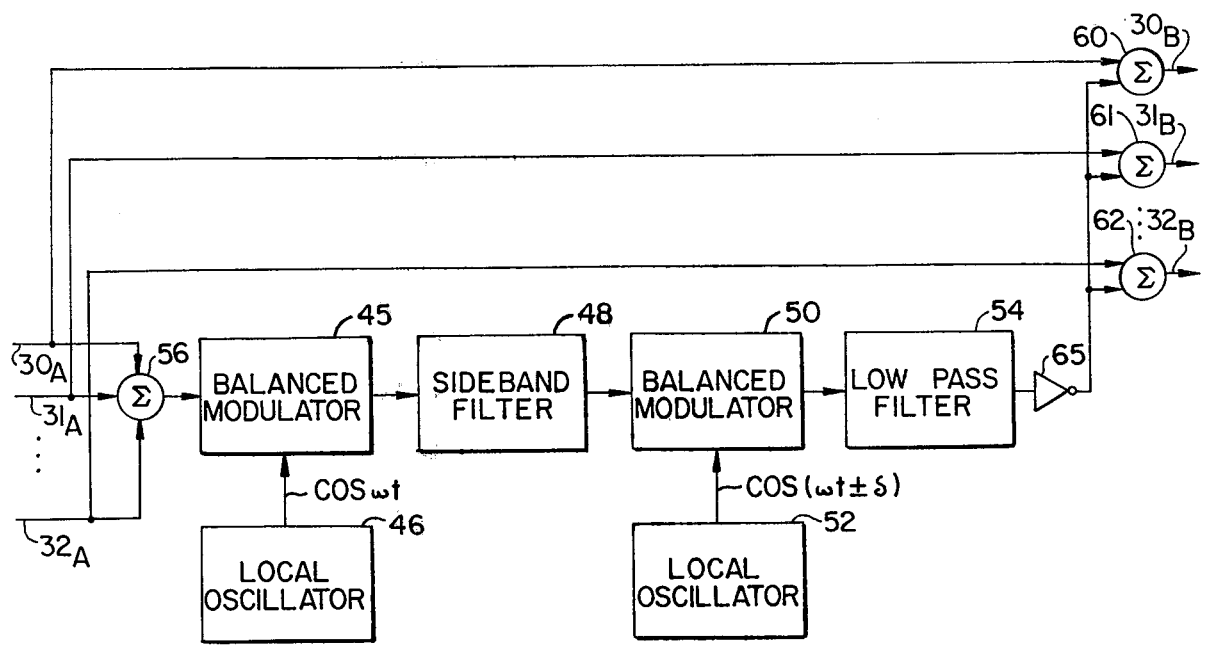
FIG._3.
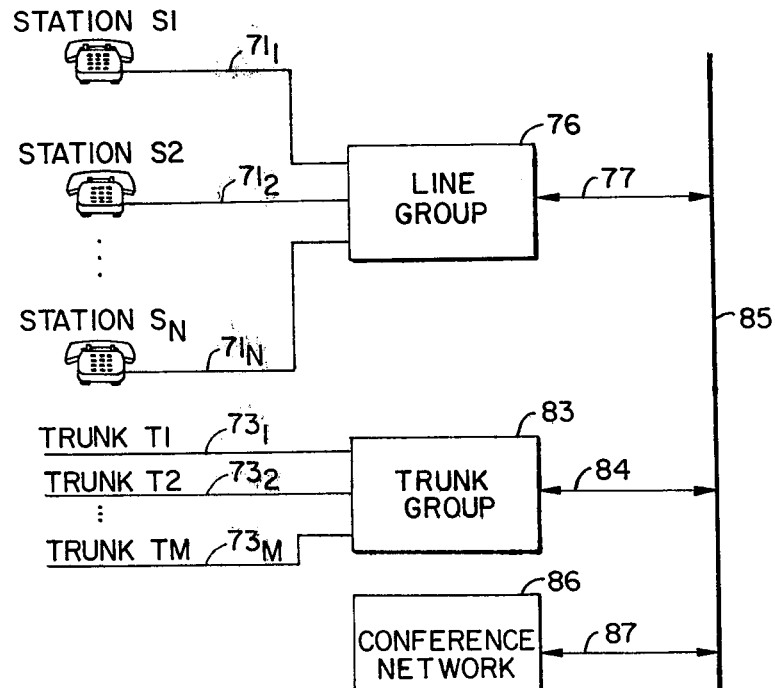
FIG._5.
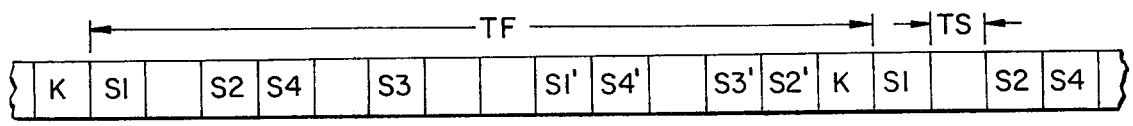
FIG._6.

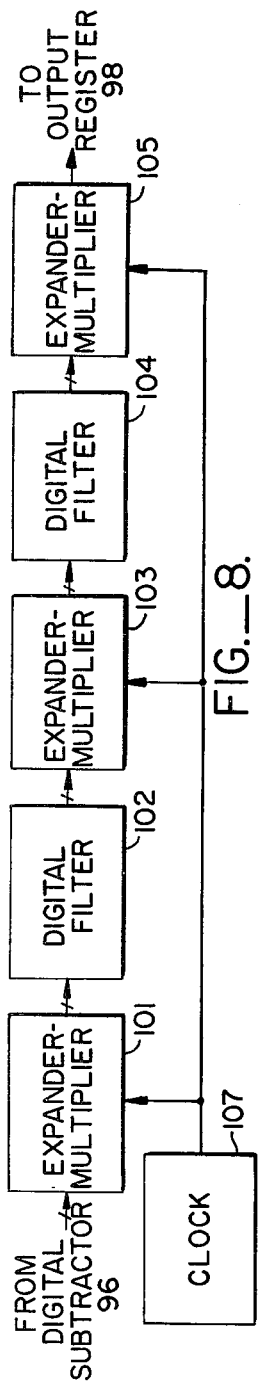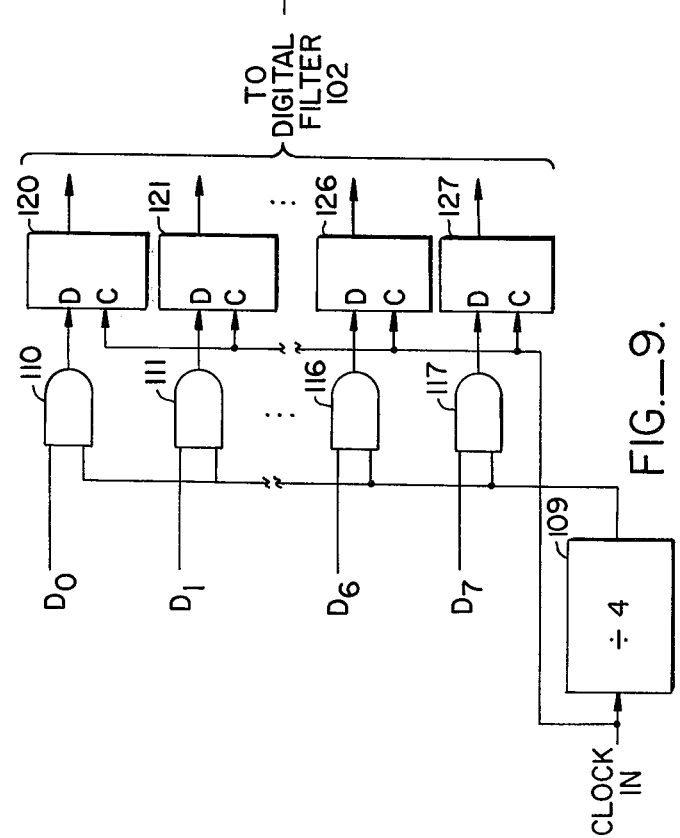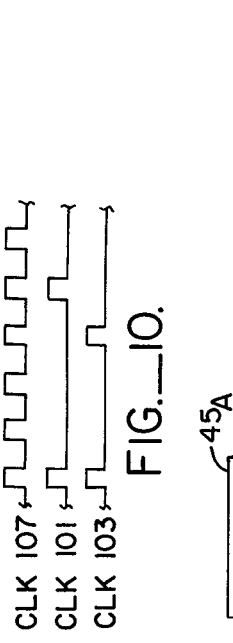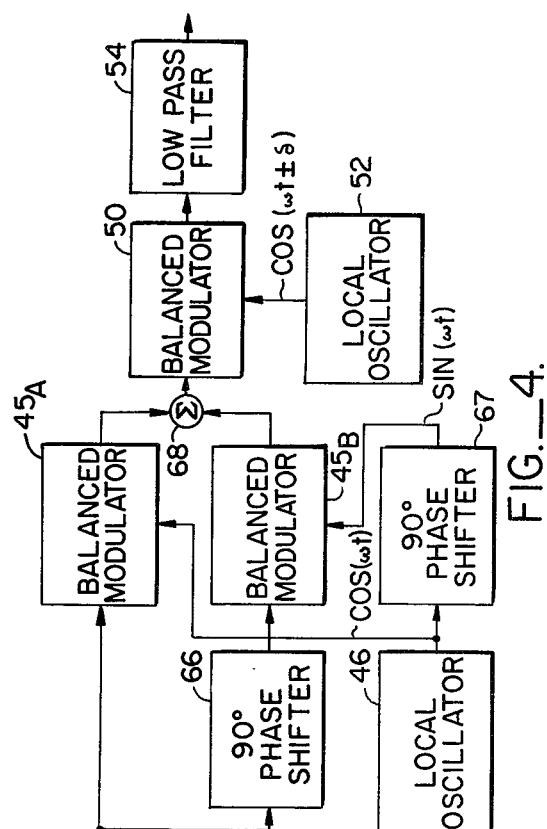

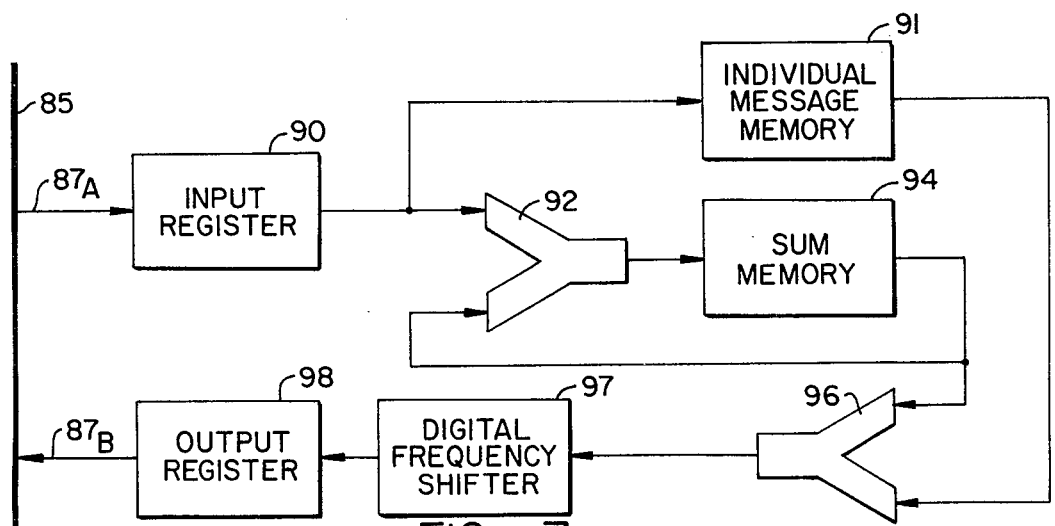
FIG._7.
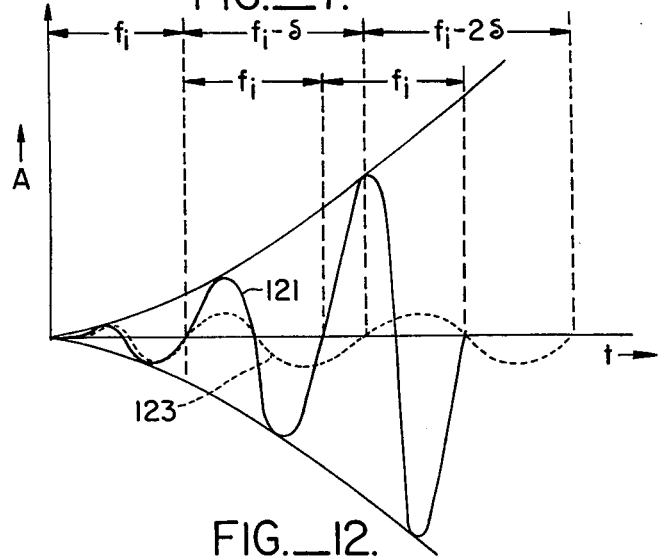
FIG._12.
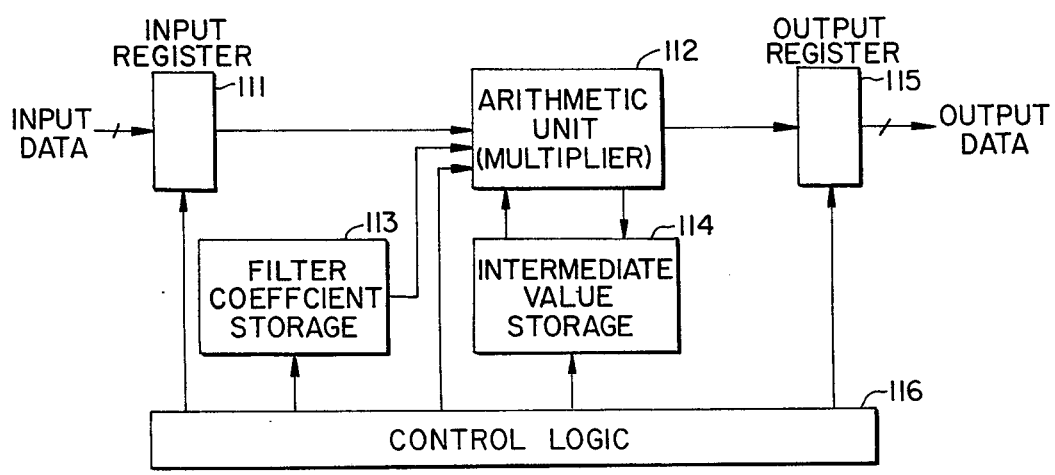
FIG._11.

METHOD AND SYSTEM FOR REDUCING CONFERENCE BRIDGE OSCILLATIONS

BACKGROUND OF THE INVENTION

This invention relates to signal communication systems, particularly telephone switching networks, in which conference bridges are employed to interconnect a plurality of communicating parties. More specifically, this invention relates to a system and method for improving the performance of such conference bridges.

Conference bridges are known which are employed in signal communication systems, particularly telephone switching systems, to permit more than two communicating parties to participate in a telephone conversation. In a typical conference bridge, the circuitry is designed in order to enable each participant in the conference to hear the sum of all of the participants' signals, minus that participant's contribution to the total. In such an arrangement, a summing network is typically provided for summing the electrical information signals from each of the individual participants' station sets, whether local or remote, and a plurality of subtraction circuits are provided each having the resultant sum signal as one input and the signal from one of the participants' station sets as the other input for supplying a partial sum signal to that participant.

In a typical telephone network, the circuits employed to interconnect the individual station sets (and trunk lines) are "two wire" circuits in which information flows bi-directionally on a pair of wires coupled to any given station set or trunk. The "two wire" signals are converted to "four wire" signals by means of circuits known as "hybrid" circuits at all junctions between the two wire circuit paths and the equipment, such as the station sets or the telephone switchboard. In operation, when information signals are to be transmitted between items of equipment, a first hybrid associated to the first equipment item carries the appropriate signal across the four wire to two wire interface and subtracts the expected effects of the transmitted signal from any signal present on the two wire interface. At the other junction of the two wire path a second hybrid circuit associated to the other equipment item (e.g., a station set) carries the two wire signal across the two wire to four wire interface in a similar manner. Proper operation of each hybrid circuit is predicated upon the assumption that each item of terminating equipment exhibits a given impedance value to the hybird. So long as the impedances of the individual terminating equipment items as viewed by the hybrid are well-known and well behaved, each hybrid circuit will function in a proper manner. However, if the impedance of a given item is not well-known or is not well behaved, the operation of both the associated hybrid and the entire system will be adversely affected. In the example given above, if the impedance of the two wire line at the junction between the first equipment item and that line is well known and well behaved, the expected effects of the transmitted signal are sufficiently predictable so that the result of the subtraction on the four wire side of the first hybrid comprises only the signal on the two wire side which was transmitted from the designated station set. However, if the impedance of the two wire line is not well-known or is not well behaved, the information signal on the four wire side of the hybrid, after the subtraction, will contain additional information corresponding to the signal transmitted from the first hybrid to the designated station set. This result has been conceptualized as a reflection of a portion of the signal sent to the designated station set off the hybrid circuit and back to the equipment on the four wire side.

This reflection phenomenon assumes critical importance when several ports of a conference bridge are in use in a telephone switching system, since the impedances of the two wire circuits seen by each conference port hybrid do not meet the assumption criteria noted above. Thus, when several ports of a conference bridge are in use, the combined reflections of the signals back to the conference bridge may lead to an unstable condition in which the conference bridge circuitry and the several ports form an oscillator, resulting in the generation of audible sounds which at best impair the intelligibility of the speech signals perceived at the several individual station sets and at worst may damage the hearing of the conference participants. In a time division multiplexed digital switching system, a conference bridge of the type noted above is even more prone to oscillation since there is a fixed delay in each signal path caused by the sampling and desampling process employed in such a system and since substantial phase shifting of the signals occurs in the filters associated to the sampling and desampling circuitry. Even if the conference bridge does not actually oscillate, operation close to the unstable conditions noted above impairs the quality of the perceived speech signals at the individual conferenced station sets, usually perceived as a "hollowness".

Qualitatively, the conference bridge and ports will oscillate at those frequencies for which the gain of the system comprising the conference bridge circuitry including the ports exceeds unity and for which the phase shift produced on these signals by the system cause the aggregate of the reflected signals to be in phase with the transmitted signal. If the gain at one potentially oscillatory frequency dominates, the system will oscillate at only that frequency with saturation generated harmonics thereof.

SUMMARY OF THE INVENTION

The invention comprises a method and system for substantially reducing or eliminating conference bridge oscillations of the type noted above, which is implementable in both analog or digital switch communication systems, and which employs the technique of frequency shifting the information signals so that potentially oscillatory frequencies will not be reinforced to cause undesired system oscillation.

In a first aspect the invention comprises a method for conferencing different ones of a plurality of individual station sets in a signal communication system, the station sets being capable of transmitting and receiving electrical information signals, the method including the steps of summing the electrical information signals from individual ones of the plurality of station sets, frequency shifting the signals resulting from the step of summing by predetermined amount and coupling the signals resulting from the step of frequency shifting to individual ones of the station sets. In a first embodiment of the method, the electrical information signals from all of the individual ones of the plurality of station sets are first summed, and the signals from each of the individual ones of the plurality of station sets are subtracted from this sum in order to form a plurality of separate partial sum signals, which are then individually frequency shifted. In an alternate embodiment, the electrical information signals from all of the individual ones of the plurality of station sets are summed, and this sum is frequency shifted, after which the signals from each of the individual ones of the plurality of station sets are individually subtracted from the frequency shifted sum signal.

The frequency shifting step may be performed on analog electrical information signals by modulating the sum signals with a first carrier signal train, filtering the signals resulting from the modulating step in order to remove substantially all frequency components lying outside a predetermined side band, modulating the filtered signals with a second carrier signal train having a frequency which differs from the frequency of the first carrier signal train by the predetermined amount, and filtering the signals resulting from the second modulating step to remove substantially all frequency components lying outside the system frequency pass band. Alternatively, the frequency shifting may be performed on either the separate partial sum signals or the complete set of summed signals by modulating such signals with a first carrier signal train, modulating a phase shifted version of such signals with a correspondingly phase shifted version of the first carrier signal train, summing the signals resulting from the two modulating steps, modulating the signals resulting from the summing step with a second carrier signal train having a frequency which differs from the frequency of the first carrier signal train by said predetermined amount, and filtering the signals resulting from the preceding modulating step to remove substantially all frequency components lying outside the system frequency pass band. The second carrier signal train frequency may equal either the sum of the frequency of the first carrier signal train and the predetermined amount, or the difference between the frequency of the first carrier signal train and the predetermined amount.

When the electrical information signals to be frequency shifted are digital, such as time division multiplexed digital signals, the step of frequency shifting may be performed in the digital domain by digitally expanding the spectral range of the signals to provide a plurality of replicas of the spectral content of the signals distributed over a wide spectral range, digitally filtering the expanded signals to filter out predetermined portions of the expanded range, digitally shifting the frequency of the remaining replicas by a second expansion, and digitally filtering the frequency shifted replicas to filter out unwanted portions of the shifted spectrum.

In another aspect, the invention comprises a system for conferencing different ones of a plurality of station sets in a signal communication system, each station set being capable of transmitting and receiving electrical information signals, the system including means for summing the electrical information signals from individual ones of the plurality of sets, means for frequency shifting the signals produced by the summing means by a predetermined amount, and means for coupling the frequency shifted signals produced by the frequency shifting means to individual ones of the station sets. In a first embodiment of this aspect of the invention, the summing means includes means for summing the electrical information signals from all of the individual ones of the plurality of sets, means for individually subtracting the signals from each of the individual ones of the plurality of sets from the signals produced by the last named summing means to form a plurality of separate partial sum signals; and the frequency shifting means includes means for individually frequency shifting each of the separate partial sum signals. In an alternate embodiment of this aspect of the invention, the summing means includes means for summing the electrical information signals from all of the individual ones of the plurality of sets, and the frequency shifting means includes means for frequency shifting the resulting sum signals and means for subtracting the signals from each of the individual ones of the plurality of sets from the resulting frequency shifted sum signals.

When embodied in an analog communication switching system, the frequency shifting means includes first modulator means for mixing the signals produced by the summing means with a first carrier signal train, first filter means coupled to the output of the first modulator means for removing substantially all frequency components lying outside a predetermined side band, second modulator means coupled to the output of the first filter means for mixing the signal output therefrom with a second carrier signal train having a frequency which differs from the sum of frequency of the first carrier signal train by the predetermined amount, and second filter means coupled to the output of the second modulator means for removing substantially all frequency components lying outside the system frequency pass band. Alternatively, the frequency shifting means includes first modulator means for mixing the signals produced by the summing means with a first carrier signal train, first phase shifter means for phase shifting the signals produced by the summing means by a second predetermined amount, second phase shifting means for shifting the phase of the first carrier signal train by a corresponding amount, second modulator means coupled to the output of the first and second phase shifter means for mixing the signals input thereto, summing means coupled to the output of the first modulator means and the second modulator means for removing substantially all frequency components lying outside a predetermined side band, third modulator means coupled to the output of the summing means for mixing the signal output therefrom with a second carrier signal train having a frequency which differs from the frequency of the first carrier signal train by said predetermined amount, and filter means coupled to the output of the third modulator means for removing substantially all frequency components lying outside the system frequency pass band. The second carrier signal train frequency may be either equal to the sum of the first carrier signal train frequency and the predetermined amount, or the difference between the frequency of the first carrier signal train and the predetermined amount.

When embodied in a digital signal switching communications system, the frequency shifting means includes a digital frequency shifting device. The digital frequency shifting device preferably comprises first means for providing a first plurality of replicas of the spectral content of the signals output from the summing means distributed over an expanded frequency spectrum, first digital filter means for removing first predetermined ones of the replicas, second means for providing a second plurality of frequency shifted replicas of the spectral content of the signals output from the first digital filter means, and second digital filter means for removing second predetermined ones of the second plurality of replicas.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a block diagram illustrating a telephone switching system embodying the invention;

FIG. 2 is a block diagram of a first analog embodiment of the invention;

FIG. 3 is a block diagram of an alternate analog embodiment of the invention;

FIG. 4 is a block diagram of another analog embodiment of the invention;

FIG. 5 is a block diagram of a digital telephone switching system embodying the invention;

FIG. 6 is a timing diagram illustrating the time division multiplexed digital signal format employed in the system of FIG. 5;

FIG. 7 is a block diagram of a digital embodiment of the invention suitable for use in the system of FIG. 4;

FIG. 8 is a block diagram of the digital frequency shifter portion of the embodiment of FIG. 7;

FIG. 9 is a combined block and logic diagram illustrating the expander/multiplier portion of the digital frequency shifter of FIG. 8;

FIG. 10 is a timing diagram illustrating the digital frequency shifting operation;

FIG. 11 is a block diagram of the digital filters of FIG. 8; and

FIG. 12 is a waveform diagram illustrating the concept of the invention.

DESCRIPTION OF THE PREFERRED EMBODIMENTS

Turning now to the drawings, FIG. 1 illustrates in general block diagram form a telephone switching system embodying the invention. As seen in this figure, a plurality of local station sets S1, S2, ..., SN are coupled via two wire conductor paths $11_1$, $11_2$, ..., $11_N$ to a switching system 16. Also connected to switching system 16 via two wire paths $17_1$, $17_2$, ..., $17_M$ are a plurality of trunk lines T1, T2, ..., TM, which are coupled at the remote end to central office (C0) switching equipment.

Switching system 16 may comprise any one of a number of known systems, either analog or digital, such as the ROLM CBX, Northern Telcom SL/1 or SG-1, Stromberg-Carlson Crossreed 800, ITT TE-400, or Western Electric CSS-201 (Dimension).

Coupled to the switching system 16 by means of individual two wire paths 22, 23, ..., 25, hybrids 26–28 and four wire interface paths 30-32 is a conference network 33 embodying one of several different forms of the invention noted below.

With reference to FIG. 2, which illustrates a first embodiment of the invention compatible with analog speech signals, a plurality of such speech signals are coupled to a conventional conference bridge 35 from individual station sets and/or trunk lines selected by switching system 16 via interface input lines $30_A$–$32_A$. Conference bridge 35 contains known circuitry for forming the electrical sum of all selected inputs and for individually subtracting each separate input signal from this sum. Thus, for example, the signal present on output terminal 37 of conference bridge 35 consists of the electrical summation of all of the input signals to conference bridge 35, minus the signal present on input terminal $30_A$; the signal present on output terminal 38 consists of the summation of all input signals minus the signal present on input terminal $31_A$; ...; and the signal present on output terminal 39 consists of the summation of all of the input signals minus the signal present on input terminal $32_A$. Each output terminal 37, 38, ..., 39 of conference bridge 35 is coupled to the input of a separate signal processing network, generally designated by reference numeral 42. Since all networks 42 are identical, only that network 42 associated to output terminal 39 is illustrated in detail. Output terminal 39 is coupled to the input of a first balanced modulator 45, the remaining input to which is a carrier signal train having a frequency $\omega T$, which is generated by a local oscillator 46. The output signals from balanced modulator 45, which comprise the sum and difference frequencies, are coupled to a side band filter 48 in which either the upper or lower side band of the modulation products is filtered out. The remaining side band signal present at the output of filter 48 is coupled to the input of a second balanced modulator 50, the other input to which is a carrier signal train generated by a second local oscillator 52 and having a frequency $wt \pm \delta$. The output of balanced modulator 50 is coupled to a low pass filter (or band pass filter) 54, which operates on the signals input thereto by removing all frequency components other than those lying within the frequency pass band of switching system 16.

In operation, the input signals to network 42 present on terminal 39 are first modulated by modulator 45 to produce frequency modulated signals lying substantially above the frequency pass band of the switching system 16. Side band filter 48 selects one of the two side bands of the modulation products for further processing. If the upper side band is selected by filter 48, this side band is demodulated using a carrier signal frequency $wt - \delta$ which introduces an upward frequency shift by an amount $\delta$. Assuming again that the upper side band is selected by filter 48, a carrier signal of frequency $wt + \delta$ may also be used to demodulate the signals input to balanced modulator 50 which introduces a downward frequency shift by an amount $\delta$. Similarly, if the lower side band signals are selected by filter 48, demodulation with a carrier signal train of frequency $wt - \delta$ introduces a downward frequency shift by an amount $\delta$, while demodulation with a carrier signal having a frequency $\omega t - \delta$ introduces an upward frequency shift by an amount $\delta$. Thus, the output signals present on output terminal $32_B$, which are coupled back to the originating station set or trunk corresponding to the input signals on terminal $32_A$, comprise information signals whose original frequencies have been shifted by a slight amount toward one of the two edges of the system frequency pass band. Similarly, the signals present at output terminals $30_B$ and $31_B$ exhibit a corresponding frequency shift. Thus, any reflection of the frequency shifted signals in passing through the several hybrid circuits in the switching system reduces the probability of oscillation in the conference network 33 by shifting frequency components away from those frequencies at which oscillation is possible (i.e. those frequencies at which system gain exceeds unity and at which the system phase shifts cause the aggregate of the reflected signals to be in phase with the signals to be transmitted to the individual station sets or trunk lines). The actual optimum values for delta may be selected on a theoretical or empirical basis and thus may be best tailored to the requirements of a particular system. $\delta$ should be small enough that the perceived voice quality is not substantially adversely affected and large enough that there is significant difference between the system response at the frequencies of system resonances and frequencies δ away from those frequencies.

FIG. 3 illustrates an alternate embodiment of the invention requiring only a single signal processing network 42. As seen in this FIG., the individual information signals present on input terminals $30_A$, $31_A$, $32_A$ are all summed in a summing network 56, the output of which is coupled to the input of the first balanced modulator 45. Each input terminal $30_A$–$32_A$ is also coupled to one input terminal of a different one of a plurality of output summing networks 60, 61 . . . , 62. The remaining input to each of the output summing networks 60, 61, . . . , 62 is the output signal from low pass filter 54 which is inverted by inverting amplifier 65. In the FIG. 3 embodiment, elements 45, 46, 48, 50, 52, and 54 function in a manner identical to that described above for the network 42 of the FIG. 2 embodiment. However, the signals which are processed by network 42 are the additive combination of all of the input signals, rather than the partial sums employed in the FIG. 2 embodiment. Thus, in the embodiment of FIG. 3 after the summed signals have been processed by network 42 the frequency shifted sum signals are individually subtracted from the separate input signals present on terminals $30_A$–$32_A$, and coupled back via output terminals $30_B$–$32_B$ to the respective station sets or trunk lines via switching system 16.

FIG. 4 illustrates an alternate embodiment of the analog signal processing network suitable for use in either the multiple network embodiment of FIG. 2 or the single network embodiment of FIG. 3. As seen in FIG. 4, the analog input signals, either from conference bridge 35 (FIG. 2) or from summing network 56 (FIG. 3) are coupled directly to the input of a balanced modulator $45_A$ and also to the input of a 90° phase shifter network 66. The output of the phase shifter network 66 is coupled to the input of a balanced modulator $45_B$. The carrier input to balanced modulator $45_A$ comprises the output of local oscillator 46; while the carrier input to balanced modulator $45_B$ is a 90° phase shifted version of the output of local oscillator 46 provided by a second 90° phase shifter 67. The modulated carrier output signals from modulators $45_A$ and $45_B$ are combined in a summing network 68 which eliminates one of the two side bands. The output of summing network 68 is coupled to the input of a balanced modulator 50, and the remainder of the FIG. 4 processing network functions in the manner described above with respect to the elements 50, 52 and 54. The FIG. 4 embodiment is known as a single side band phase cancellation system.

In addition to use in fully analog switched communication systems, the invention may also be used in a digital switching system, such as the Rolm CBX noted above. With reference to FIG. 5, in a digital switching system the analog signals from the individual station sets S1, S2, . . . , SN are coupled via two wire conductor paths $71_1$, $71_2$, . . . , $71_N$ to a line group unit 76 which contains the necessary analog and digital circuitry required to convert analog input signals from the individual station sets to equivalent digital signals compatible with the time division multiplexed signal format, and to convert time division multiplexed digital signals to analog signals for transmission to designated station sets. Similarly, the central office trunks T1, T2, . . . , TM are coupled via two wire conductor paths $73_1$, $73_2$, . . . , $73_M$ to a trunk group unit 83 which provides the same functional capability with respect to signals on the trunk lines. Both the line group unit 76 and the trunk group unit 83 are coupled via multipath conductors 77, 84 to a common digital bus back plane 85 over which the information signals in digital form are routed under control of a digital computer (not shown) to various units in the system. Conference network 86 is also coupled to back plane 85 via multiconductor path 87 and performs an essentially identical set of functions to those described above for conference network 33 of the FIG. 1 system, under control of the computer. With reference to FIG. 6, which illustrates the time division multiplexed digital signal format commonly employed, a plurality of successive time frames are established by appropriate timing and control circuitry, each time frame being divided up into K time slots, each having a predetermined period of duration TS. Each local station set requiring connection to either another local station set or a trunk line is assigned a particular time slot by the computer, and successive digital samples of the originating analog speech signals are routed from given station set or trunk line to the various portions of the system during the duration of successive ones of the assigned time slot. Thus, assuming that four station sets S1, S2, S3 and S4 are to be conferenced together the individual station sets may be assigned time slots as shown in FIG. 6. Note that the order or assignment is generally not critical and that the assigned time slots need not be contiguous. Similarly, calls returned to a given station set from the conference network 86 (signified in FIG. 6 by the prime symbol) are assigned different time slots, and the order of assignment need not be identical to the order of assignment for the time slots carrying the signal information from the station sets to the conference network. For example, the order of assignment for the time slots carrying messages from the station sets selected to the conference network shown in FIG. 6 is S1, S2, S4 and S3; while the order of assignment of the time slots carrying the messages from the conference network 86 to the individual station sets selected is S1', S4', S3', and S2'.

FIG. 7 illustrates in block diagram form conference network 86. As seen in this FIG., time division multiplexed digital signals from back plane 85 are coupled to an input register 90 along with clock signals on multiconductor path portion 87A. The successively stored digital signals in input register 90 are subsequently stored in an individual message memory unit 91, which may comprise a random access memory (RAM), and are also supplied to one input of a digital adder 92. The remaining input to digital adder 92 is the output of a sum memory unit 94 in which the sum of all the corresponding time frame signals is stored. The sum in memory unit 94 is updated sequentially by digitally adding the successively appearing individual digital input words from input register 90 to the sums already stored previously in memory unit 94, the addition being performed in digital adder 92.

The time frame sum stored in memory unit 94 is sequentially subtracted from the individual digital signals stored in memory unit 91 and corresponding to the message samples from the conference station sets in digital subtractor 96. The individual partial sum signals are then frequency shifted in a digital frequency shifter unit 97, and the frequency shifted individual partial sum message segments are stored in an output register 98. The message samples stored in output register 98 are coupled via multiconductor path portion $87_B$, back plane 85 and line group 76 (FIG. 5) to the corresponding station set during the appropriate time slot. It should be noted that the input register 90 and output register 98 may comprise different locations in a single RAM, and that multiconductor paths 87$_A$ and 87$_B$ may comprise a single shared multiconductor bus.

FIG. 8 illustrates the digital frequency shifted unit 97 of FIG. 7. As seen in this figure, digital difference samples from subtractor 96 are coupled to the input of a first digital expander-multiplier 101 which generates integral multiples of band information in the digital domain. The output of expander multiplier 101 is coupled to the input of a first digital filter 102 which filters out predetermined frequency bands. The output of filter 102 is coupled to the input of a second expander multiplier 103 which generates different multiples of band information from that provided by expander multiplier 101. The output of expander multiplier 103 is coupled to the input of a second digital filter 104 which filters out different bands from the digital spectrum from digital filter 102. The output of digital filter 104 is coupled to the input of a third expander multiplier 105 which functions in a manner similar to expander multiplier 101. The output of expander multiplier 105 is coupled to output register 98.

FIG. 9 illustrates an expander-multiplier logic circuit suitable for use as elements 101, 103 and 105. As seen in this figure, clock signals from clock 107 (FIG. 8), which have a substantially higher rate than the system sampling rate for the digital switching system illustrated in FIG. 5, are divided by four in divider network 109 and coupled to a first input of a plurality of AND gates 110, 111, . . . 117. The remaining input to gates 110–117 comprises the individual data bits D0–D7 from digital subtractor 96 (assuming an 8 bit digital character for the system). The output terminal of each of the AND gates 110–117 is coupled to the D input of a plurality of D type flip-flops 120–127, which are clocked by means of the clock signal from clock unit 107. The data outputs of each of the flip-flops 120–127 are coupled in parallel to the data inputs of digital filter 102.

With reference to FIG. 10, the data flip-flops 120–127 are clocked at the higher rate afforded by the clock from unit 107 (designated CLK107), while the actual individual data samples from the digital subtractor 96 are only transmitted through the AND gates 110–117 at the 25% rate afforded by the output of divide by four unit 109 (CLK101). As a result, for each data sample input to the expander multiplier 101, three zeros are inserted therebetween. The effect of the processing by expander multiplier 101 is to provide a plurality of replicas of the sampled frequency content centered about different points on a wide frequency spectrum scale.

Digital filter 102, illustrated in FIG. 11, selects predetermined ones of the replicas for further processing by the follow on expander multiplier 103. Expander multiplier 103 is essentially identical to the expander multiplier 101 illustrated in FIG. 9, with the exception that expander multiplier 103 enables the input AND gates at a different rate, illustrated in FIG. 10 (CLK103) as one-third the rate of CLK107. The effect of the processing provided by expander multiplier 103 is to provide another plurality of replicas of the information output from filter 102 but shifted along the frequency spectrum scale in order to provide the frequency shift of the invention. Digital filter 104 then selects a predetermined spectral portion and functions in a manner analogous to an anti-alias filter in the analog domain. Expander multiplier 105, which is essentially identical to expander multiplier 101 and clocked at the same rate, functions to resynchronize the samples to the backplane data rate.

FIG. 11 is a block diagram of a digital filter suitable for use as filters 102 and 104. As seen in this figure, data from the preceding expander multiplier is coupled to an input register 111 and thence to an arithmetic unit 112 in which each multi-bit digital character is multiplied by filter coefficients stored in digital form in storage unit 113, which may be a RAM or a ROM. During multiplication, intermediate values are stored in intermediate value storage unit 114. The output of arithmetic unit 112 is coupled to an output register 115 and thence to the follow-on expander multiplier.

Units 111–115 are under control of control logic unit 116 containing the necessary elements to control the desired digital frequency filtering process.

FIG. 12 is a waveform diagram illustrating the concept of the invention. With reference to this figure, waveform 121 illustrates the undesired oscillatory buildup which can occur in conferencing systems devoid of the invention. More particularly, waveform 121, illustrated as a single frequency signal whose frequency is $f_i$ undergoes exponentially increasing amplitude buildup for each cycle of the wave when the oscillation criteria noted above are met. Waveform 123, on the other hand, although initially having a frequency $f_i$, is shifted in frequency by an amount δ during each pass through the conferencing network: Thus, rather than undergoing increasing amplitude excursions at the oscillation frequency, the waveform 123 maintains substantially the same amplitude. It should be noted that, although the example of FIG. 12 is illustrated with respect to frequency processing in which the frequency of the information waveform is decreased by a small amount δ for each pass through the circuitry, equivalent results are obtained by shifting the frequency upward by the amount δ for each pass through the circuitry so that the frequency of the information waveform is increased by a small amount δ.

The actual value of δ, i.e., the amount of the frequency shift applied to the signals, can be determined empirically for any given telephone switching system. The lower limit on any given suitable δ range is primarily determined by the amount of amplitude suppression required to prevent oscillation. In some systems, the lower value of δ may be as small as 2 Hz. The upper limit on a given δ range is determined by the desired perceptibility of the speech or tone information to be provided by the system. Generally speaking, the greater the value of δ, the greater the impairment of the intelligibility of the speech signals produced.

While the above provides a complete disclosure of the preferred embodiments of the invention, various modifications, alternate constructions and equivalents may be employed, as desired. For example, the individual signal frequencies may be shifted by frequency scaling, i.e., multiplying each frequency by a constant, rather than by the algebraic addition technique described above. Therefore, the above description and illustrations should not be construed as limiting the scope of the invention, which is defined by the appended claims.

What is claimed is:

1. For use in a signal communication system having a conferencing network used to interconnect different ones of a plurality of station sets capable of transmitting and receiving electrical information signals, said signal communication system having a system frequency pass band, said conferencing network having means for summing the electrical information signals from individual ones of said plurality of station sets and means for coupling signals output from said summing means to individual ones of said station sets, the improvement comprising means for frequency shifting the signals output from said summing means by a predetermined amount.

2. The combination of claim 1 wherein said frequency shifting means includes first modulator means for mixing the signals output from said summing means with a first carrier signal train, first filter means coupled to the output of said first modulator means for removing substantially all frequency components lying outside a predetermined side band, second modulator means coupled to the output of said first filter means for mixing signals output therefrom with a second carrier signal train having a frequency which differs from the frequency of said first carrier signal train by said predetermined amount, and second filter means coupled to the output of said second modulator means for removing substantially all frequency components lying outside said system frequency pass band from signals output from said second modulator means.

3. The combination of claim 2 wherein said second carrier signal train frequency is equal to the sum of the frequency of said first carrier signal train and said predetermined amount.

4. The combination of claim 2 wherein said second carrier signal train frequency is equal to the difference between the frequency of said first carrier signal train and said predetermined amount.

5. The combination of claim 1 wherein said frequency shifting means includes first modulator means for mixing the signals produced by said summing means with a first carrier signal train, first phase shifter means for phase shifting the signals produced by said summing means by a predetermined amount, second phase shifting means for shifting the phase of said first carrier signal train by an amount corresponding to said predetermined amount, second modulator means coupled to the outputs of said first and second phase shifter means for mixing signals input thereto, summing means coupled to the outputs of said first modulator means and said second modulator means for removing substantially all frequency components lying outside a predetermined side band, third modulator means coupled to the output of said summing means for mixing signals output therefrom with a second carrier signal train having a frequency which differs from the frequency of said first carrier signal train by said predetermined amount, and filter means coupled to the output of said third modulator means for removing substantially all frequency components lying outside said system frequency pass band.

6. The combination of claim 5 wherein said second carrier signal train frequency is equal to the sum of the frequency of said first carrier signal train and said predetermined amount.

7. The combination of claim 5 wherein said second carrier signal train frequency is equal to the difference between the frequency of said first carrier signal train and said predetermined amount.

8. The combination of claim 1 wherein said frequency shifting means comprises a digital frequency shifting device.

9. The combination of claim 8 wherein said digital frequency shifting device comprises first expander means for providing a first plurality of replicas of the spectral content of the signals output from said summing means distributed over an expanded frequency spectrum, first digital filter means for removing first predetermined ones of said replicas, second expander means for providing a second plurality of frequency shifted replicas of the spectral content of signals output from said first digital filter means, second digital filter means for removing second predetermined ones of the second plurality of replicas and third expander means for providing a third plurality of frequency shifted replicas of the spectral content of signals output from said second digital filter means.

10. A method for conferencing different individual ones of a plurality of station sets in a signal communication system, said station sets being capable of transmitting and receiving electrical information signals, said method comprising the steps of:
(a) summing the electrical information signals from all of said individual ones of said plurality of station sets;
(b) individually subtracting the signals from each of said individual ones of said plurality of station sets from the signals resulting from step (a) to form a plurality of separate partial sum signals;
(c) individually frequency shifting each of said separate partial sum signals by a predetermined amount; and
(d) coupling the signals resulting from step (c) to individual ones of said station sets.

11. A method for conferencing different individual ones of a plurality of station sets in a signal communication system, said station sets being capable of transmitting and receiving electrical information signals, said method comprising the steps of:
(a) summing the electrical information signals from all of said individual ones of said plurality of station sets;
(b) frequency shifting the resulting sum signal by a predetermined amount;
(c) individually subtracting the signals from each of said individual ones of said plurality of station sets from said resulting sum signal; and
(d) coupling the signals resulting from step (c) to individual ones of said station sets.

12. The method of claim 10 or 11 wherein said step of frequency shifting includes the steps of (i) modulating said partial sum signals (claim 10) or said sum signal (claim 11) with a first carrier signal train, (ii) filtering the signals resulting from step (i) to remove substantially all frequency components lying outside a predetermined side band, (iii) modulating the signals resulting from step (ii) with a second carrier signal train having a frequency which differs from the frequency of said first carrier signal train by said predetermined amount, and (iv) filtering the signals resulting from step (iii) to remove substantially all frequency components lying outside said system frequency pass band.

13. The method of claim 12 wherein said second carrier signal train frequency is equal to the sum of the frequency of said first carrier signal train and said predetermined amount.

14. The method of claim 12 wherein said second carrier signal train frequency is equal to the difference between the frequency of said first carrier signal train and said predetermined amount.

15. The method of claim 10 or 11 wherein said step of frequency shifting includes the steps of (i) modulating said partial sum signals (claim 10) or said sum signal (claim 11) with a first carrier signal train, (ii) modulating a phase shifted version of said partial sum signals or said sum signal with a correspondingly phase shifted version of said first carrier signal train, (iii) summing the signals resulting from steps (i) and (ii), (iv) modulating the signals resulting from step (iii) with a second carrier signal train having a frequency which differs from the frequency of said first carrier signal train by said predetermined amount, and (v) filtering the signals resulting from step (iv) to remove substantially all frequency components lying outside said system frequency pass band.

16. The method of claim 15 wherein said second carrier signal train frequency is equal to the sum of the frequency of said first carrier signal train and said predetermined amount.

17. The method of claim 15 wherein said second carrier signal train frequency is equal to the difference between the frequency of said first carrier signal train and said predetermined amount.

18. The method of claim 10 or 11 wherein said step of frequency shifting is performed in the digital domain.

19. A system for conferencing different individual ones of a plurality of station sets in a signal communication system having a frequency pass band, each station set being capable of transmitting and receiving electrical information signals, said system comprising:
means for summing the electrical information signals from all of said individual ones of said plurality of sets;
means for individually subtracting the signals from each of said individual ones of said plurality of sets from summing signals produced by said summing means to form a plurality of separate partial sum signals;
means for individually frequency shifting each of said separate partial sum signals by a predetermined amount; and
means for coupling frequency shifted signals produced by said frequency shifting means to individual ones of said sets.

20. A system for conferencing different individual ones of a plurality of station sets in a signal communication system having a frequency pass band, each station set being capable of transmitting and receiving electrical information signals, said system comprising:
summing means for summing the electrical information signals from all of the individual ones of said plurality of sets;
means for frequency shifting summing signals output from said summing means by a predetermined amount;
means for individually subtracting the signals from each of said individual ones of said plurality of sets from resulting frequency shifted sum signals; and
means for coupling frequency shifted signals produced by said subtracting means to individual ones of said sets.

21. The combination of claim 19 or 20 wherein said frequency shifting means includes first modulator means for mixing signals produced by said subtracting means (claim 19) or said summing means (claim 20) with a first carrier signal train, first filter means coupled to the output of said first modulator means for removing substantially all frequency components lying outside a predetermined side band, second modulator means coupled to the output of said first filter means for mixing signals output therefrom with a second carrier signal train having a frequency which differs from the frequency of said first carrier signal train by said predetermined amount, and second filter means coupled to the output of said second modulator means for removing substantially all frequency components lying outside said system frequency pass band.

22. The combination of claim 21 wherein said second carrier signal train frequency is equal to the sum of said first carrier signal train frequency and said predetermined amount.

23. The combination of claim 21 wherein said second carrier signal train frequency is equal to the difference between the frequency of said first carrier signal train and said predetermined amount.

24. The combination of claim 19 or 20 wherein said frequency shifting means includes first modulator means for mixing signals produced by said subtracting means (claim 19) or said summing means (claim 20) with a first carrier signal train, first phase shifter means for phase shifting signals produced by said summing means by a second predetermined amount, second phase shifting means for shifting the phase of said first carrier signal train by an amount corresponding to said second predetermined amount, second modulator means coupled to the outputs of said first and second phase shifter means for mixing signals input thereto, additional summing means coupled to the outputs of said first modulator means and said second modulator means for removing substantially all frequency components lying outside a predetermined side band, third modulator means coupled to the output of said additional summing means for mixing signals output therefrom with a second carrier signal train having a frequency which differs from the frequency of said first carrier signal train by said predetermined amount, and filter means coupled to the output of said third modulator means for removing substantially all frequency components lying outside said system frequency pass band.

25. The combination of claim 24 wherein said second carrier signal train frequency is equal to the sum of said first carrier signal train frequency and said predetermined amount.

26. The combination of claim 24 wherein said second carrier signal train frequency is equal to the difference between the frequency of said first carrier signal train and said predetermined amount.

27. The combination of claim 19 or 20 wherein said frequency shifting means comprises a digital frequency shifting device.

28. The combination of claim 27 wherein said digital frequency shifting device comprises first expander means for providing a first plurality of replicas of the spectral content of signals output from said summing means distributed over an expanded frequency spectrum, first digital filter means for removing first predetermined ones of said replicas, second expander means for providing a second plurality of frequency shifted replicas of the spectral content of signals output from said first digital filter means, second digital filter means for removing second predetermined ones of said second plurality of replicas and third expander means for providing a third plurality of frequency shifted replicas of the spectral content of signals output from said second digital filter means.

* * * * *